W. C. BRENNER.
GRAIN POLISHING DEVICE.
APPLICATION FILED SEPT. 14, 1920.
1,408,978.
Patented Mar. 7, 1922.
2 SHEETS—SHEET 2.
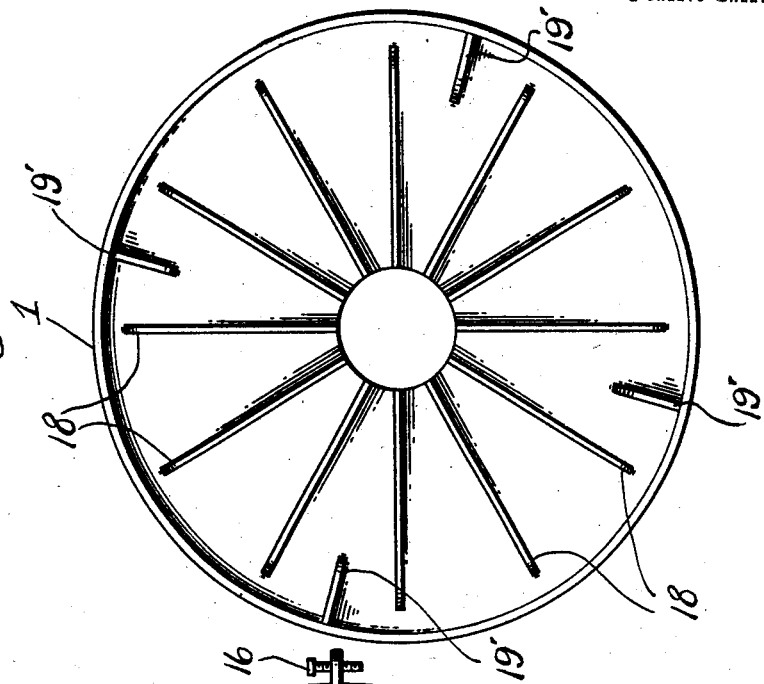
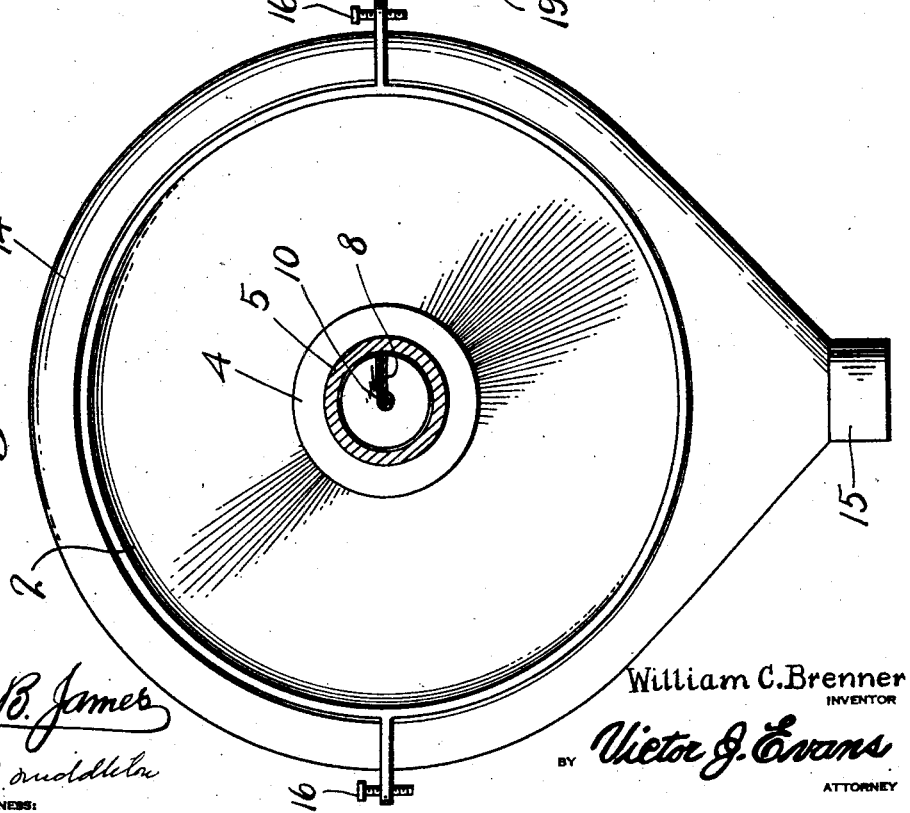
William C. Brenner
INVENTOR
BY Victor J. Evans
ATTORNEY

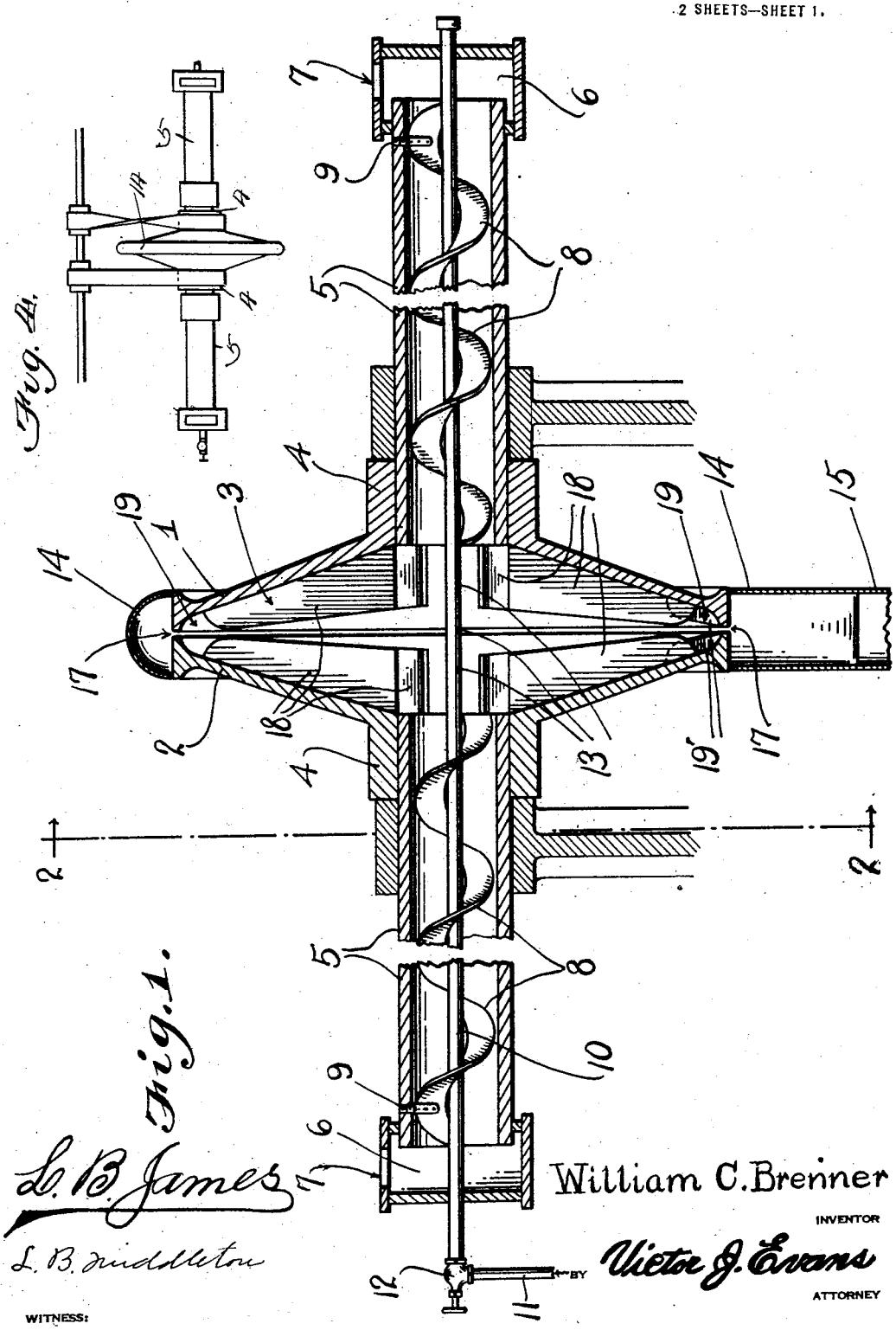

UNITED STATES PATENT OFFICE.

WILLIAM C. BRENNER, OF EVANSVILLE, INDIANA.

GRAIN-POLISHING DEVICE.

1,408,978.  Specification of Letters Patent.  Patented Mar. 7, 1922.

Application filed September 14, 1920. Serial No. 410,125.

*To all whom it may concern:*

Be it known that I, WILLIAM C. BRENNER, a citizen of the United States, residing at Evansville, in the county of Vanderburg and State of Indiana, have invented new and useful Improvements in Grain-Polishing Devices, of which the following is a specification.

This invention relates to a device for scouring, polishing and peeling grain, the general object of the invention being to introduce the grain into a chamber formed by a pair of conical discs rotating in opposite directions and provided with means for forcing the grains together as they are passed through the chamber.

Another object of the invention is to provide means for subjecting the grains while in the chamber to the action of steam or water.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a longitudinal section of the invention.

Figure 2 is a cross section on line 2—2 of Figure 1.

Figure 3 is a face view of one of the discs.

Figure 4 is a top plan view of the invention.

In these views 1 and 2 indicate a pair of discs of substantially conical shape which are so arranged as to form a chamber 3. The hubs 4 of the discs are secured to the tubular shafts 5 which are journaled in suitable supports and which are adapted to be rotated in opposite directions by any suitable means. At the outer end of each shaft a chamber 6 is formed into which the grain is passed through the inlet 7. A spiral conveyor 8 is located in each shaft and is secured thereto by the post 9. A pipe 10 passes through both shafts and through the discs and has one end closed and its other end connected by a pipe 11 with a source of steam or water supply. A valve 12 controls the flow of steam or water into said pipe 10.

Perforations 13 are formed in the central part of the pipe 10 so as to permit the discharge of its contents in the chamber 3. A casing 14 surrounds the discs and this casing widens out at its lower part into the outlet 15. The casing is supported from a stationary part by the lugs and bolts 16. The casing is slightly spaced from the discs so as to permit free movement of said discs. Its inner circumference is open and the small space 17 between the adjacent outer edges of the discs communicates with the interior of the casing so that the grains passing from the chamber through said space will be discharged into the casing. The inner face of each disc carries a plurality of radiating plates 18 which are wider at their inner ends than at their outer ends as clearly shown in Figure 1. The outer ends of these plates are rounded and terminate a slight distance from the curved outer edges of the discs so as to leave an equalizing space 19 for the grains. From this space the grain passes through the space 17 into the stationary casing. Short plates 19 are alternately arranged with the plates 18, these plates 19 extending inwardly from the curved edges of the discs and terminating slightly beyond the ends of the plates 18. These plates 19 are so arranged as to crowd the grain towards the center or friction line. The plates 18 act as propeller flights, while the plates 19 act as deflector flights, these plates forcing the grain through the chamber and tending to press it towards the center. The outlet 15 is provided with a suitable valve and this should be kept closed until the chamber between the discs and the tubular shafts is full of grain. The discharge valve is then opened to permit a certain quantity of grain to pass therethrough but the opening of this valve must be so adjusted as to keep a certain amount of grain in the device. A great pressure is maintained in the equalizing space 19 by reason of the centrifugal force acting on the grain as it passes over the propeller flights 18. Under this pressure one half of the volume of grain is caused to rasp against the other half by reason of the faces of the discs revolving in opposite directions, thus causing violent agitation of the grain in the line of attrition. It will be seen that the discs are so formed that the chamber between the two decreases in width gradually to the point of discharge. The arrangement of the propeller flights 18 provides the equalizing space 19 and maintains balance. The casing 11 when full prevents the discs from throwing the grains out through opening 17 before the grain is thoroughly scoured.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

The combination with a support, of a pair of tubular shafts journaled in suitable bearings in said supports, a pair of substantially conical shaped discs provided with hubs rotatably mounted on said shafts and engaging said supports, a plurality of radiating plates carried by the inner face of each disc, a plurality of relatively short plates alternately arranged with said radiating plates and extending inwardly from the curved edges of said discs, a spiral conveyor located in each shaft, means for securing said conveyor to said shafts, a pipe extending through both shafts and through said discs and provided with a plurality of openings between said discs, valve control means supplying steam to said pipe, means for rotating said shafts in opposite directions, means for supplying grain to the outer ends of said tubular shafts, and a casing surrounding said discs and provided with substantially V-shaped outlet.

In testimony whereof I affix my signature.

WILLIAM C. BRENNER.